(12) United States Patent
Tang et al.

(10) Patent No.: US 12,105,008 B2
(45) Date of Patent: Oct. 1, 2024

(54) FLUID SYSTEM AND SAMPLE PROCESSOR INCLUDING FLUID SYSTEM

(71) Applicants: Beckman Coulter, Inc., Brea, CA (US); Beckman Coulter Biotechnology (Suzhou) Co., Ltd., Jiangsu (CN)

(72) Inventors: Linqun Tang, Suzhou (CN); Simon Nava, Miami, FL (US); Juntao Yuan, Suzhou (CN); Liang Shi, Suzhou (CN)

(73) Assignees: Beckman Coulter, Inc., Brea, CA (US); Beckman Coulter Biotechnology (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 17/790,955

(22) PCT Filed: Nov. 30, 2021

(86) PCT No.: PCT/CN2021/134279
§ 371 (c)(1),
(2) Date: Jul. 5, 2022

(87) PCT Pub. No.: WO2022/156374
PCT Pub. Date: Jul. 28, 2022

(65) Prior Publication Data
US 2023/0121733 A1   Apr. 20, 2023

(30) Foreign Application Priority Data
Jan. 22, 2021 (CN) .......................... 202110089283.1

(51) Int. Cl.
*G01N 15/1404* (2024.01)
*B01L 3/00* (2006.01)
*G01N 15/1409* (2024.01)

(52) U.S. Cl.
CPC .......... *G01N 15/1404* (2013.01); *B01L 3/502* (2013.01); *B01L 2200/146* (2013.01);
(Continued)

(58) Field of Classification Search
CPC ....... G01N 15/1404; G01N 2015/1409; G01N 15/1459; G01N 15/1434; G01N 35/1009;
(Continued)

(56) References Cited

U.S. PATENT DOCUMENTS

| 4,108,602 A * | 8/1978 | Hanson .............. G01N 35/1097 73/866 |
| 6,397,665 B1 * | 6/2002 | Kirts .................... G01N 29/223 73/579 |
| 2002/0192113 A1 * | 12/2002 | Uffenheimer ...... G01N 35/1002 422/562 |

(Continued)

FOREIGN PATENT DOCUMENTS

| CN | 106413901 A | 2/2017 |
| CN | 209296733 U | 8/2019 |

(Continued)

OTHER PUBLICATIONS

PCT International Searching Authority; International Search Report and Written Opinion for PCT/CN2021/134279 mailed Mar. 24, 2022, 8 pages.
International Search Report and Written Opinion, PCT/CN2021/134249, Beckman Coulter, Inc. et al., 9 pages (Mar. 24, 2022).

*Primary Examiner* — Jill A Warden
*Assistant Examiner* — Jacqueline Brazin
(74) *Attorney, Agent, or Firm* — Merchant & Gould P.C.

(57) ABSTRACT

The present disclosure relates to a fluid system for a sample processor and a sample processor including the fluid system. The fluid system includes a sample line, a processing fluid line, a vacuum line, and an air pump. The sample line communicates a sample container with a sample port of a flow cell unit. The processing fluid line communicates a sheath fluid container with a processing fluid port of the flow cell unit. The vacuum line is in communication with the flow cell unit. The air pump includes a first output port and a second output port. Pressurized gas is generated at the first output port, and the first output port is in communication
(Continued)

with the sample container and the sheath fluid container. A vacuum is generated at the second output port, and the second output port is in communication with a vacuum port of the flow cell unit through the vacuum line.

16 Claims, 8 Drawing Sheets

(52) U.S. Cl.
CPC ..... *B01L 2300/049* (2013.01); *B01L 2300/14* (2013.01); *B01L 2400/049* (2013.01); *B01L 2400/0622* (2013.01); *G01N 15/1409* (2024.01)

(58) Field of Classification Search
CPC ........ G01N 35/1004; G01N 2035/1025; B01L 3/502; B01L 2200/146; B01L 2300/049; B01L 2300/14; B01L 2400/049; B01L 2400/0622
USPC ....................................................... 422/501
See application file for complete search history.

(56) References Cited

U.S. PATENT DOCUMENTS

| | | |
|---|---|---|
| 2006/0012784 A1* | 1/2006 | Ulmer ................. B01L 3/50273 356/246 |
| 2007/0122309 A1 | 5/2007 | Nagai et al. |
| 2012/0125126 A1* | 5/2012 | Subramanian ..... G01N 15/1404 73/863.01 |
| 2013/0343149 A1 | 12/2013 | Fox et al. |
| 2018/0113063 A1 | 4/2018 | Kersten |
| 2020/0056979 A1 | 2/2020 | Ghazi |
| 2021/0039093 A1* | 2/2021 | Jones ..................... G06V 20/69 |
| 2021/0229101 A1* | 7/2021 | Li ....................... B01L 3/50273 |

FOREIGN PATENT DOCUMENTS

| | | |
|---|---|---|
| JP | 6086947 U | 6/1985 |
| JP | 02-213746 A | 7/2002 |
| JP | 04-076458 | 3/2004 |
| JP | 2005308506 | 11/2005 |
| JP | 2007101311 A | 4/2007 |
| JP | 2017512495 A | 5/2017 |
| JP | 2020-513576 A | 5/2020 |
| WO | 2015053393 | 4/2015 |

* cited by examiner

FLUID SYSTEM AND SAMPLE PROCESSOR INCLUDING FLUID SYSTEM

CROSS-REFERENCE TO RELATED APPLICATIONS

This application is a national stage application of PCT/CN2021/134279, filed Nov. 30, 2021, which claims the benefit of and priority to Chinese Patent Application No. 2021110089283.1, filed Jan. 22, 2021, the entire contents of both of which are incorporated herein by reference.

TECHNICAL FIELD

The present disclosure relates to a fluid system for a sample processor and a sample processor including the fluid system, for example, a flow cell sorter or analyzer.

BACKGROUND

The content in this section only provides background information related to the present disclosure, and does not necessarily constitute the prior art.

Sorters or analyzers are often used for analyzing and sorting samples such as microsomes or cells. A flow sorter or analyzer includes a fluid conveying unit, a flow cell unit, and a sample analyzing or sorting unit. The fluid conveying unit is configured to provide a stable pressure source to convey a sample and a sheath fluid or cleaning fluid to the flow cell unit, and suck or discharge, by a vacuum, a waste fluid generated after the sample is processed or the flow cell unit is cleaned. In the flow cell unit, the sheath fluid wraps the sample and flows out for analysis or sorting. The sample analyzing or sorting unit includes optical apparatuses, electrical apparatuses, and the like for detecting, analyzing, or sorting samples. Before or after an operation or when a failure occurs, the fluid conveying unit may convey the cleaning fluid to the flow cell unit to clean the flow cell unit, and then discharge the waste fluid generated after the cleaning.

The fluid conveying unit uses a pump to provide a stable pressure source to supply various fluids, and uses another pump to provide a vacuum to discharge the waste fluid. However, due to limitations of the size and weight of the two pumps and vibration, the two pumps are usually arranged independently outside an instrument housing. Two pumps (especially two external pumps) make the sorter or analyzer have a larger overall size, heavier weight, and higher cost. Moreover, since the two pumps are located outside the instrument housing, it is inconvenient in transportation and installation.

Therefore, it is expected in the art to provide a sorter or an analyzer with a compact structure, low cost, and convenient operation.

SUMMARY OF THE INVENTION

This section provides a general summary of the present disclosure, rather than a comprehensive disclosure of the full scope of the present disclosure or all features of the present disclosure.

An objective of the present disclosure is to provide a fluid system for a sample processor, which has a compact structure, low cost, and convenient operation.

An objective of the present disclosure is to provide a sample processor, which has a compact structure, low cost, and convenient operation.

According to one aspect of the present disclosure, a fluid system for a sample processor is provided. The fluid system includes a sample line, a processing fluid line, a vacuum line, and an air pump. The sample line communicates a sample container with a sample port of a flow cell unit. The processing fluid line communicates a sheath fluid container with a processing fluid port of the flow cell unit. The vacuum line is in communication with the flow cell unit. The air pump includes a first output port and a second output port. Pressurized gas is generated at the first output port, and the first output port is in communication with the sample container and the sheath fluid container. A vacuum is generated at the second output port, and the second output port is in communication with a vacuum port of the flow cell unit through the vacuum line.

The fluid system according to the present disclosure has an air pump integrating a vacuum source and a pressure source. Therefore, the fluid system including the air pump may have a smaller total installation size, a smaller total weight, and is easy to carry and assemble.

In some examples according to the present disclosure, a vacuum chamber is arranged in the vacuum line, and the vacuum chamber is in communication with a waste fluid container through the air pump so that a waste fluid sucked from the vacuum chamber is discharged directly into the waste fluid container.

In some examples according to the present disclosure, the second output port of the air pump is connected to a bottom of the vacuum chamber.

In some examples according to the present disclosure, a vacuum chamber is arranged in the vacuum line. A reversing valve is arranged between the vacuum chamber and the first output port and second output port of the air pump to vacuumize or pressurize the vacuum chamber selectively. The vacuum chamber is in communication with the waste fluid container through a fluid line.

In some examples according to the present disclosure, the fluid line is connected to the bottom of the vacuum chamber. An outlet of the reversing valve is connected to an upper part of the vacuum chamber.

In some examples according to the present disclosure, a reversing valve is arranged in the processing fluid line, and the reversing valve is configured to communicate the sheath fluid container or a cleaning fluid container with the flow cell unit selectively.

In some examples according to the present disclosure, the reversing valve is configured to: when the reversing valve is switched to the cleaning fluid container, suck a cleaning fluid in the cleaning fluid container to the flow cell unit by means of the vacuum generated at the second output port of the air pump; and after the cleaning fluid is sucked to the flow cell unit, switch the reversing valve to the sheath fluid container, and spray the fluid in the flow cell unit out through a spray port of the flow cell unit by means of the pressurized gas generated at the first output port of the gas pump.

In some examples according to the present disclosure, the fluid system further includes a waste fluid line and a waste fluid pump. The waste fluid line discharges the waste fluid flowing out of the spray port of the flow cell unit into the waste fluid container. The waste fluid pump is arranged in the waste fluid line.

In some examples according to the present disclosure, the fluid system further includes a sheath fluid pressure adjusting apparatus and a sample pressure adjusting apparatus. The sheath fluid pressure adjusting apparatus is arranged upstream of the sheath fluid container and configured to adjust a pressure of the pressurized gas supplied into the sheath fluid container. The sample pressure adjusting apparatus is arranged upstream of the sample container and configured to adjust a pressure of the pressurized gas supplied to the sample container.

In some examples according to the present disclosure, the fluid system further includes a sheath fluid pressure sensor configured to detect a pressure of the sheath fluid supplied from the sheath fluid container into the flow cell unit.

In some examples according to the present disclosure, the sheath fluid pressure adjusting apparatus is configured to automatically adjust, according to the pressure of the sheath fluid detected by the sheath fluid pressure sensor, the pressure of the pressurized gas supplied to the sheath fluid container In some examples according to the present disclosure, the sheath fluid pressure sensor is arranged in the sheath fluid line.

In some examples according to the present disclosure, the sheath fluid pressure sensor is positioned in a position at a constant distance from the flow cell unit in a vertical direction.

In some examples according to the present disclosure, the sheath fluid pressure sensor is arranged in the flow cell unit.

In some examples according to the present disclosure, the fluid system further includes a sheath fluid level sensor arranged in the sheath fluid container and used for detecting a fluid level of the sheath fluid.

In some examples according to the present disclosure, the sheath fluid pressure adjusting apparatus is configured to automatically adjust, according to the fluid level detected by the sheath fluid level sensor, the pressure of the pressurized gas supplied to the sheath fluid container.

According to another aspect of the present disclosure, a sample processor is provided, which includes the above fluid system and a flow cell unit.

The sample processor according to the present disclosure includes the above fluid system, and therefore has the same advantages as the above fluid system.

In some examples according to the present disclosure, the flow cell unit and the air pump are accommodated in a housing.

In some examples according to the present disclosure, the air pump is connected to the housing through a vibration isolation apparatus.

BRIEF DESCRIPTION OF THE DRAWINGS

Through the following description with reference to accompanying drawings, the features and advantages of one or more embodiments of the present disclosure will become easier to understand, and in the accompanying drawings.

DETAILED DESCRIPTION

Figure 1A:
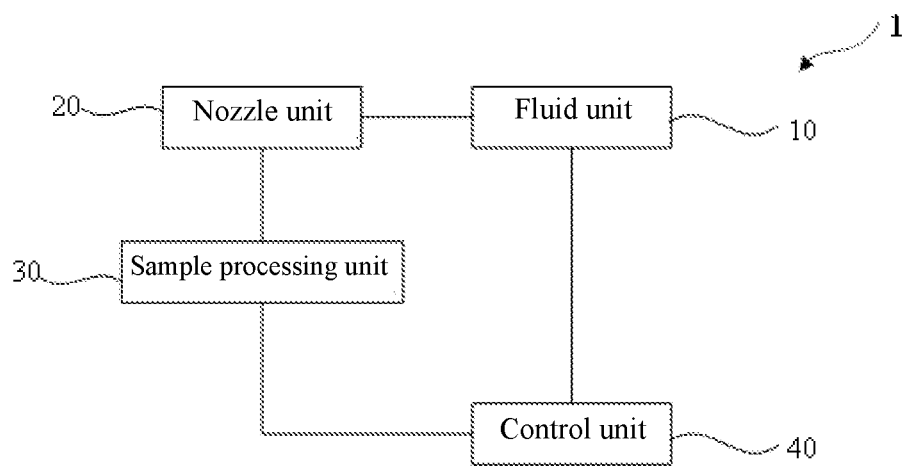
FIG. 1A is a functional block diagram of a sample processor.

The present disclosure will be described below in detail through example embodiments with reference to the accompanying drawings. In the several accompanying drawings, similar reference numerals indicate similar parts and components. The following detailed description of the present disclosure is for illustrative purposes only, and is by no means limiting the present disclosure and its applications or uses. The embodiments described in this specification are not exhaustive, but are only some of several possible embodiments. The example embodiments may be implemented in many different forms, and should not be construed as limiting the scope of the present disclosure. In some example embodiments, well-known processes, well-known device structures, and well-known technologies may not be described in detail.

FIG. 1A is a functional block diagram of sample processor 1. Samples analyzed or sorted by sample processor 1 may include cells or body fluids of organisms. It should be understood that sample processor 1 of the present disclosure is not limited to the specific samples described herein as examples.

As shown in FIG. 1A, sample processor 1 includes fluid unit 10, flow cell unit 20, sample processing unit 30, and control unit 40.

Fluid unit 10 is used for supplying various fluids to flow cell unit 20 and discharging a fluid in flow cell unit 20. The fluids described herein may include samples to be analyzed or sorted, a sheath fluid, a cleaning fluid, a waste fluid, and the like. Fluid unit 10 may include various pumps, valves, pressure adjusting apparatuses, sensors, and the like for conveying fluids or discharging fluids. For example, the pump may include a pressure pump for supplying a pressurized gas to convey the samples, the sheath fluid, or the like to flow cell unit 20, a vacuum pump for supplying a vacuum to discharge a waste fluid, and the like.

Various fluids, particularly the samples and the sheath fluid are conveyed to flow cell unit 20. In flow cell unit 20, the samples are wrapped in the sheath fluid and then discharged through a spray port of flow cell unit 20 for processing. Flow cell unit 20 is also generally referred to as a nozzle unit.

Sample processing unit 30 performs processing, such as detection, analysis, or sorting, on the samples wrapped in the sheath fluid and sprayed out through a spray port of flow cell unit 20. Sample processing unit 30 may include various optical apparatuses, electrical apparatuses, and/or mechanical apparatuses according to purposes of sample processing.

Control unit 40 controls running of entire sample processor 1, and in particular, controls operations of fluid unit 10 and sample processing unit 30. Control unit 40 includes a circuit board.

Figure 1B:
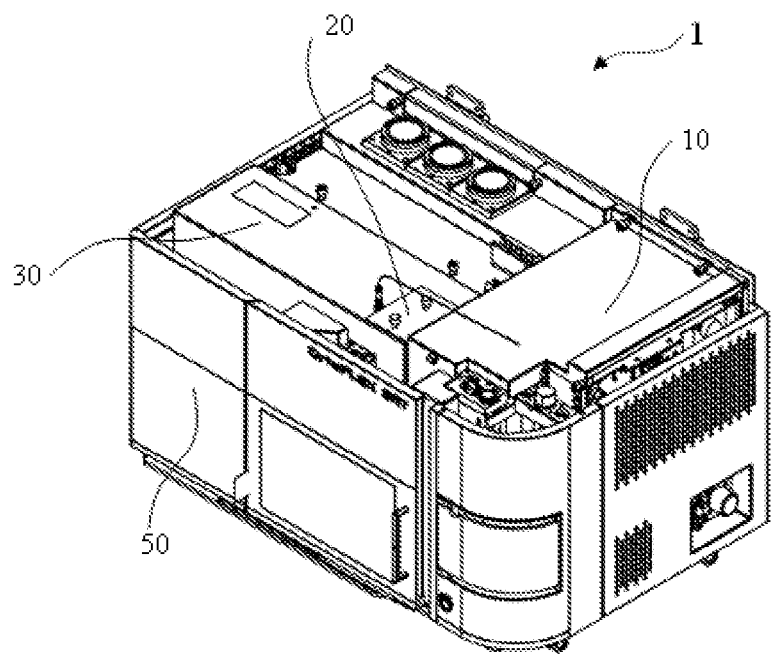
FIG. 1B is a three-dimensional schematic diagram showing the appearance of a sample processor according to an embodiment of the present disclosure.

FIG. 1B is a three-dimensional schematic diagram showing the appearance of a sample processor according to an embodiment of the present disclosure. As shown in FIG. 1B, sample processor 1 includes housing 50, and the above fluid unit 10, flow cell unit 20, sample processing unit 30, and control unit 40 are integrated and accommodated in sample processor 1. Control unit 40 includes a circuit board fixed inside housing 50, which is thus invisible in FIG. 1B.

Housing 50 may also be referred to as a frame, and is used for installing, supporting, and protecting various functional parts of sample processor 1. The housing described herein refers to an integral part that can be carried separately. Various baffles or supporting plates may be provided inside housing 50 as required. The baffles or supporting plates may be integrally formed with housing 50, or may be formed separately and then connected or fixed to housing 50. Advantageously, a smaller volume of housing 50 occupies a smaller space and has a smaller weight, which is more conducive to carrying and the like.

In an existing conventional sample processor, due to limitations of the size and weight of pumps and vibration, various pumps (such as the pressure pump and the vacuum pump as described above) are usually independently arranged outside an instrument housing. In this way, the entire sample processor has a larger overall size, heavier weight, and higher cost, and is inconvenient to transport and install.

Based on the above problems of the existing conventional sample processor, the inventor of the present application proposes a sample processor with an improved structure, which includes an integrated air pump having functions of the above pressure pump and vacuum pump (for ease of description, it is referred to as an air pump for short). The air pump is installed inside housing 50. In this way, the size and weight of the entire sample processor can be significantly reduced, and it is also convenient to carry and install.

Figure 2:
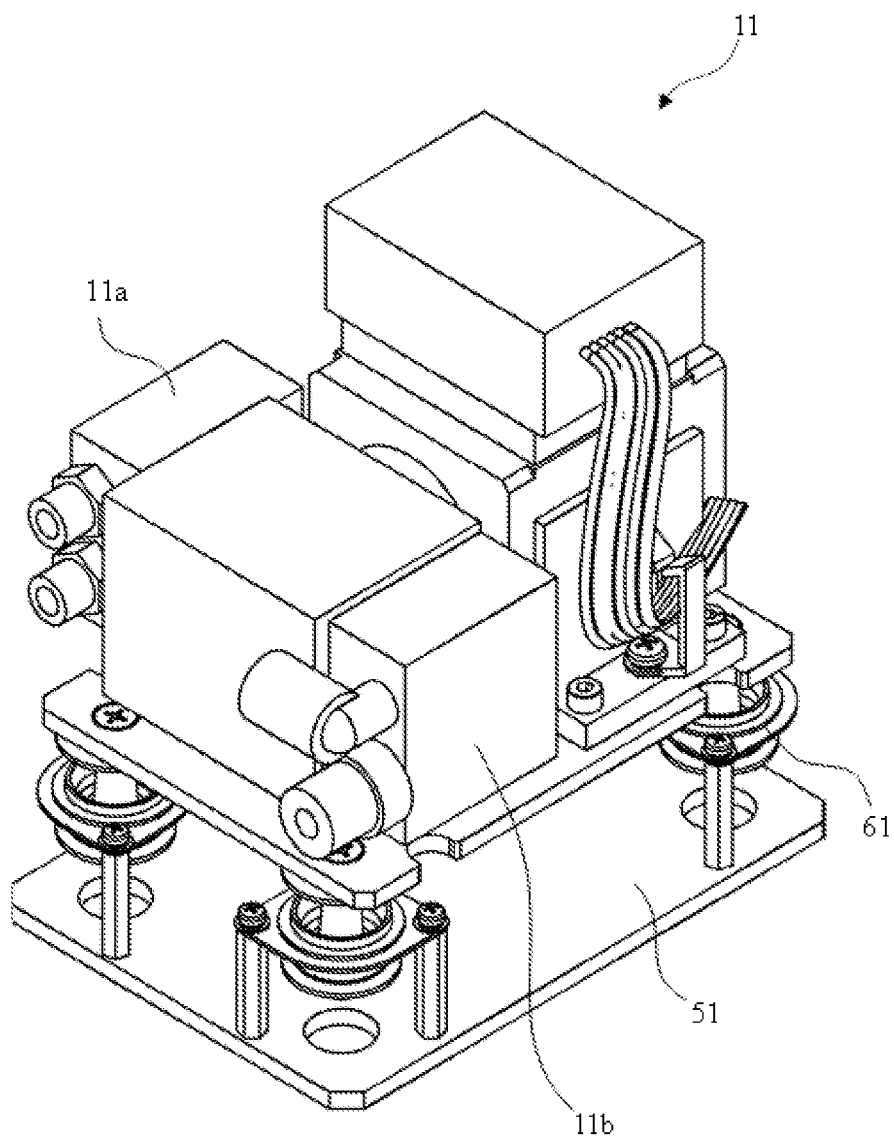
FIG. 2 is a three-dimensional schematic diagram showing the appearance of an air pump according to an embodiment of the present disclosure.

FIG. 2 is a three-dimensional schematic diagram showing the appearance of air pump 11 according to an embodiment of the present disclosure. As shown in FIG. 2, air pump 11 is installed on bottom plate 51 of housing 50 through vibration isolation apparatus 61. It is well known that the pump (especially, the pressure pump for supplying the pressurized gas) generates large vibrations during operation, and therefore, it is often installed outside the instrument housing. In sample processor 1 according to the present disclosure, vibration isolation apparatus 61 can prevent the vibration generated during the operation of air pump 11 from being transmitted to housing 50 or reduce the vibration transmitted to housing 50 to a minimum extent, thereby hardly affecting the sample processing.

Air pump 11 includes first output port 11a and second output port 11b, where a pressurized gas is generated at first output port 11a, and a vacuum is generated at second output port 11b. First output port 11a and second output port 11b are located on opposite sides of air pump 11. However, it should be understood that the structure of air pump 11 is not limited to the specific example shown, as long as it can achieve the functions described herein.

Figure 3:
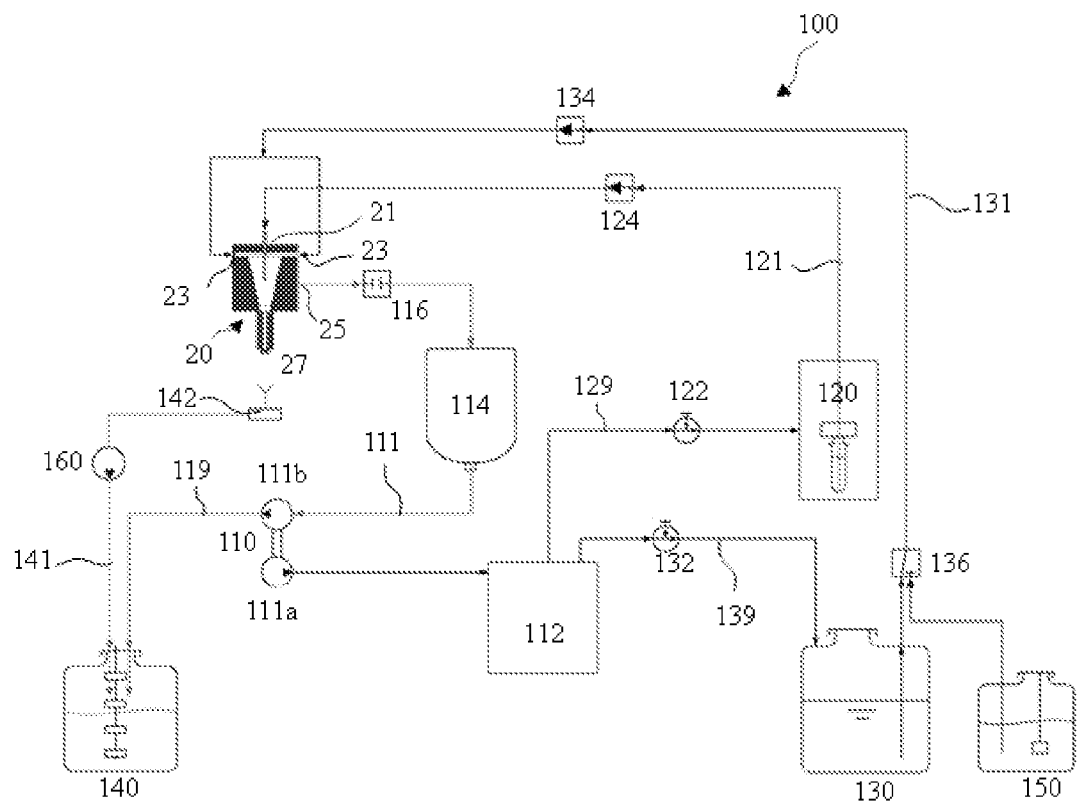
FIG. 3 is a schematic diagram of a fluid unit in a sample processing operation according to an embodiment of the present disclosure.

FIG. 3 is a schematic diagram of fluid unit 100 in a sample processing operation according to an embodiment of the present disclosure. Fluid unit 100 is configured to convey various fluids to flow cell unit 20 and discharge various fluids from flow cell unit 20. To this end, fluid unit 100 communicates various fluid sources with various ports of flow cell unit 20 through various fluid lines under the action of a power source. Flow cell unit 20 includes sample port 21 for receiving a sample, processing fluid port 23 for receiving a processing fluid such as a sheath fluid or a cleaning fluid, vacuum port 25 for sucking or discharging a waste fluid and the like, and spray port 27 for spraying the sample and the like.

As shown in FIG. 3, fluid unit 100 includes air pump 110. Air pump 110 serves as the power source of fluid unit 100, specifically a pressure source and a vacuum source. Air pump 110 includes first output port 111a and second output port 111b. The pressurized gas is generated at first output port 111a and thus the power source is provided. The vacuum is generated at second output port 111b and thus the vacuum source is provided.

First output port 111a is in communication with sample container 120 through fluid line 129. A sample to be processed is received in sample container 120. Sample container 120 is in communication with sample port 21 of flow cell unit 20 through sample line 121. In this way, after air pump 110 runs, the pressurized gas output from first output port 111a enters sample container 120 through fluid line 129. Under the action of the pressure of the pressurized gas, the sample in sample container 120 is pumped into flow cell unit 20 through sample line 121.

First output port 111a is in communication with sheath fluid container 130 through fluid line 139. The sheath fluid is received in sheath fluid container 130. Sheath fluid container 130 is in fluid communication with sample port 23 of flow cell unit 20 through processing fluid line 131. In this way, after air pump 110 runs, the pressurized gas output from first output port 111a enters sheath fluid container 130 through fluid line 139. Under the action of the pressure of the pressurized gas, the sheath fluid in sheath fluid container 130 is pumped into flow cell unit 20 through processing fluid line 131.

Sample control valve 124 may be arranged in sample line 121. Sample control valve 124 is configured to control the connection or disconnection of sample line 121, thereby allowing or preventing the sample from being pumped to flow cell unit 20. Similarly, processing fluid control valve 134 may be arranged in processing fluid line 131. Processing fluid control valve 134 is configured to control the connection or disconnection of processing fluid line 131, thereby allowing or preventing the processing fluid from being pumped to flow cell unit 20.

The processing fluid is not limited to the sheath fluid and cleaning fluid described herein, but may include any other liquid required. Sample control valve 124 and processing fluid control valve 134 may be, for example, a switch valve, a one-way valve, or any other suitable type of valve.

Sample pressure adjusting apparatus 122 may be arranged in fluid line 129. Sample pressure adjusting apparatus 122 is configured to adjust the pressure of the pressurized gas in fluid line 129 that is to be conveyed to sample container 120. For example, according to different samples or different processing conditions, the pressure of the pressurized gas conveyed to sample container 120 may be adjusted by sample pressure adjusting apparatus 122, thereby adjusting the rate or amount of the sample pumped to flow cell unit 20. Similarly, sheath fluid pressure adjusting apparatus 132 may be arranged in fluid line 139. Sheath fluid pressure adjusting apparatus 132 is configured to adjust the pressure of the pressurized gas in fluid line 139 that is to be conveyed to sheath fluid container 130. For example, when the position of the sheath fluid container, the fluid level of the sheath fluid, or the processing condition changes, the pressure of the pressurized gas conveyed to sheath fluid container 130 may be adjusted by sheath fluid pressure adjusting apparatus 132, thereby adjusting the rate or amount of the sheath fluid pumped into flow cell unit 20.

Pressure chamber 112 may be arranged on an outlet side of first output port 111a. The pressurized gas discharged from first output port 111a may be stored in pressure chamber 112, and the pressurized gas in pressure chamber 112 is conveyed to sample container 120 and sheath fluid container 130, respectively.

Second output port 111b is in fluid communication with vacuum port 25 of flow cell unit 20 through vacuum line 111. In addition, second output port 111b is also in fluid communication with waste fluid container 140 through fluid line 119. In this way, after air pump 110 runs, due to the vacuum generated at second output port 111b, the fluid in flow cell unit 20 is drawn out and discharged into waste fluid container 140 through vacuum line 111 and fluid line 119.

Debubbling valve 116 may be arranged in vacuum line 111. Debubbling valve 116 is configured to remove bubbles in flow cell unit 20 to prevent the influence on the processing of the sample. Vacuum chamber 114 may be arranged in vacuum line 111. In order to facilitate the direct discharge of the waste fluid in vacuum chamber 114 to waste fluid container 140, second output port 111b may be connected to a bottom of vacuum chamber 114. Vacuum chamber 114 may be in communication with waste fluid container 140 through second output port 111b, and therefore, it is unnecessary to arrange a valve between vacuum chamber 114 and second output port 111b.

In addition, in order to ensure the uninterrupted collection of the waste fluid into waste fluid container 140, separate waste fluid line 141 may also be arranged. Waste fluid trap 142 may be arranged below spray port 27 of flow cell unit 20. Waste fluid trap 142 collects the processed waste fluid ejected from spray port 27 into waste fluid trap 142. Waste fluid line 141 fluidly communicates waste fluid trap 142 with waste fluid container 140.

Waste fluid pump 160 may be arranged in waste fluid line 141. Waste fluid pump 160 is configured to pump the waste fluid collected in waste fluid trap 142 to waste fluid container 140. Separate waste fluid line 141 can continuously discharge the waste fluid during the operation of sample processor 1. This is particularly advantageous when air pump 110 cannot suck and discharge the waste fluid.

Reversing valve 136 may also be arranged in processing fluid line 131. Reversing valve 136 is configured to communicate containers containing different processing fluids with flow cell unit 20 selectively. In the example shown in FIG. 3, the processing fluid container includes a sheath fluid container and a cleaning fluid container. Therefore, reversing valve 136 is configured to communicate sheath fluid container 130 or cleaning fluid container 150 with flow cell unit 20 selectively. Reversing valve 136 may be, for example, a three-way valve, and has two inlets respectively connected to sheath fluid container 130 or cleaning fluid container 150 and one outlet connected to flow cell unit 20.

Figure 4:
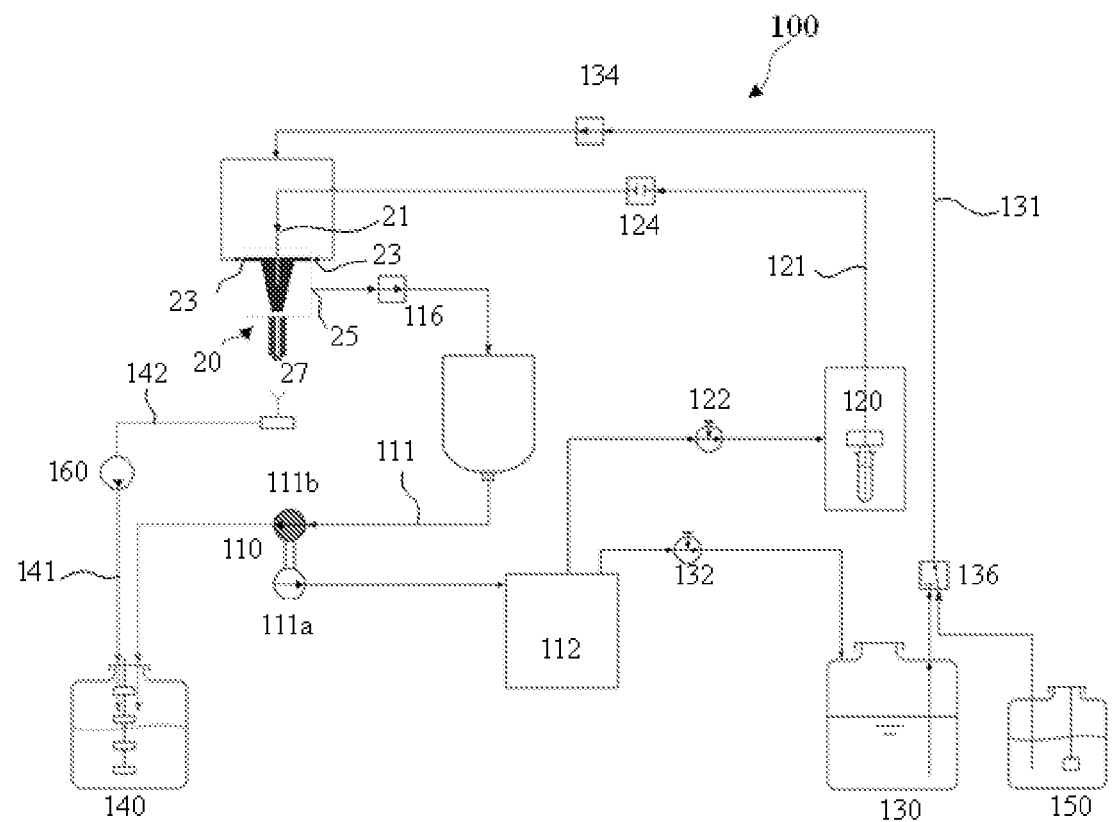
FIG. 4 is a schematic diagram of a fluid unit similar to FIG. 3 but in a cleaning operation.

FIG. 4 is a schematic diagram of fluid unit 100 similar to FIG. 3 but in a cleaning operation. As shown in FIG. 4, reversing valve 136 is switched to cleaning fluid container 150. At this time, processing fluid control valve 134 is opened to connect processing fluid line 131, that is, cleaning fluid container 150 is in communication with flow cell unit 20. Vacuum line 111 is connected, that is, second output port 111b of air pump 110 is in communication with flow cell unit 20. In this way, the cleaning fluid in cleaning fluid container 150 is sucked to flow cell unit 20 by means of the vacuum generated at second output port 111b of air pump 110, for cleaning flow cell unit 20 (especially an upper part of flow cell unit 20). Then, reversing valve 136 may be switched to sheath fluid container 130, and the cleaning fluid in flow cell unit 20 is sprayed downward from spray port 27 by the pressure of the pressurized gas generated at first output port 111a of air pump 110, thereby cleaning flow cell unit 20 (especially a lower part of flow cell unit 20).

According to cleaning requirements, the above vacuum suction process and pressure spray process can be repeated several times. The vacuum suction process and the pressure spray process may be automatically repeated at predetermined time intervals. The predetermined time or the number of repetitions may be preset in a program of a control unit, or manually input by an operator.

In the example shown in FIG. 4, there is no need to arrange a separate pump for conveying the cleaning fluid, so fluid unit 100 can be simplified, thereby further reducing the size, weight, and cost of the sample processor. In addition, there is no need to communicate air pump 110 with cleaning fluid container 150, so strength requirements for the cleaning fluid container can be reduced.

For the examples shown in FIG. 3 and FIG. 4, if waste fluid container 140, sheath fluid container 130, and cleaning fluid container 150 have relatively large volumes respectively, they may be placed outside housing 50 of sample processor 1, and all others parts (including sample container 120) may be integrated in housing 50 of sample processor 1. If each container has a small volume, all the above parts may be integrated in housing 50 of sample processor 1.

Figure 5:
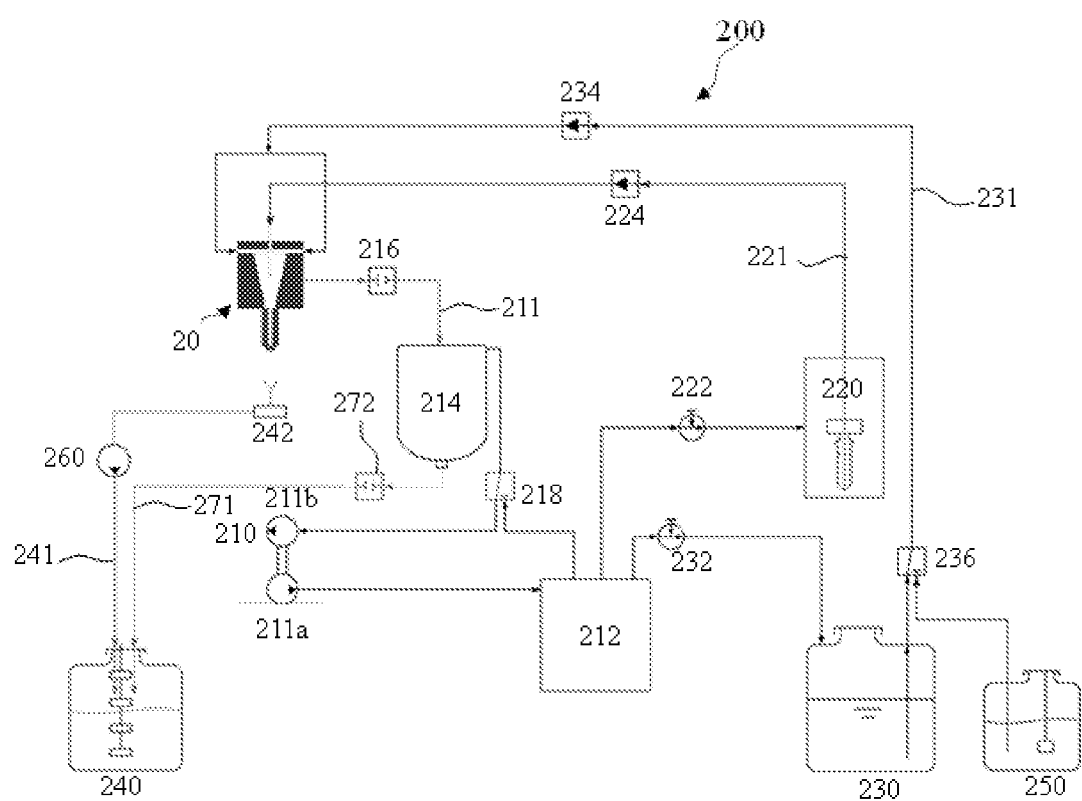
FIG. 5 is a schematic diagram of a fluid unit in a sample processing operation according to another embodiment of the present disclosure.

FIG. 5 is a schematic diagram of fluid unit 200 in a sample processing operation according to another embodiment of the present disclosure. The structure of fluid unit 200 is similar to that of fluid unit 100. Fluid unit 200 includes air pump 210, sample container 220, sheath fluid container 230, cleaning fluid container 250, waste fluid container 240, waste fluid trap 242, waste fluid pump 260, sample line 221, processing fluid line 231, vacuum line 211, and waste fluid line 241. Sample control valve 224 may be arranged in sample line 221. Processing fluid line 231 may be provided with processing fluid control valve 234 and reversing valve 236. Vacuum line 211 may be provided with debubbling valve 216 and vacuum chamber 214. Sample pressure adjusting apparatus 222 may be arranged between air pump 210 and sample container 220. Sheath fluid pressure adjusting apparatus 232 may be arranged between air pump 210 and sheath fluid container 230. The above parts of fluid unit 200 have functions and structures similar to the corresponding parts of fluid unit 100, so detailed descriptions thereof are omitted.

A difference between fluid unit 200 and fluid unit 100 is that the second output port of air pump 210 is only suitable for generating a vacuum, and not suitable for discharging a fluid in vacuum chamber 214 to waste fluid container 240. The difference between fluid unit 200 and fluid unit 100 will be described in detail below with reference to FIG. 5.

In order to discharge the fluid in vacuum chamber 214 into waste fluid container 240, fluid unit 200 further includes separate fluid line 271 that is in fluid communication with waste fluid container 240 from vacuum chamber 214. Waste fluid valve 272 may be arranged in fluid line 271 to control the connection or disconnection of fluid line 271, thereby allowing or preventing the fluid in vacuum chamber 214 from being discharged into waste fluid container 240. Waste fluid valve 272 may be, for example, a switch valve or a one-way valve.

Reversing valve 218 is arranged between vacuum chamber 214 and first output port 211a and second output port 211b of air pump 210 to vacuumize or pressurize vacuum chamber 214 selectively. Reversing valve 218 may be a three-way valve, which includes an inlet connected to second output port 211b of air pump 210, another inlet connected to pressure chamber 212, and an outlet connected to the upper part of vacuum chamber 214. Pressure chamber 212 is arranged between first output port 211a of air pump 210 and sample container 220 and sheath fluid container 230.

When reversing valve 218 is switched to second output port 211b, the fluid is sucked and discharged from flow cell unit 20 by means of the vacuum. When reversing valve 218 is switched to first output port 211a, the fluid in vacuum chamber 214 is discharged to waste fluid container 240 through fluid line 271 under the action of the pressure of the pressurized gas.

Fluid line 271 may be connected to the bottom of vacuum chamber 214, which is advantageous in discharging the fluid in vacuum chamber 214. The outlet of reversing valve 218 may be connected to the upper part of vacuum chamber 214, which facilitates the discharge of the pressurized gas into the upper space of vacuum chamber 214.

For some types of sample processors, changes in fluid pressure may have a great impact on sample processing. Therefore, such a sample processor may also be provided with a pressure adjusting apparatus, for example, the sample pressure adjusting apparatus and the sheath fluid pressure adjusting apparatus as described above. The sheath fluid pressure adjusting structure of sample processor 1 according to the present disclosure will be described below with reference to FIG. 6 to FIG. 8.

Figure 6:
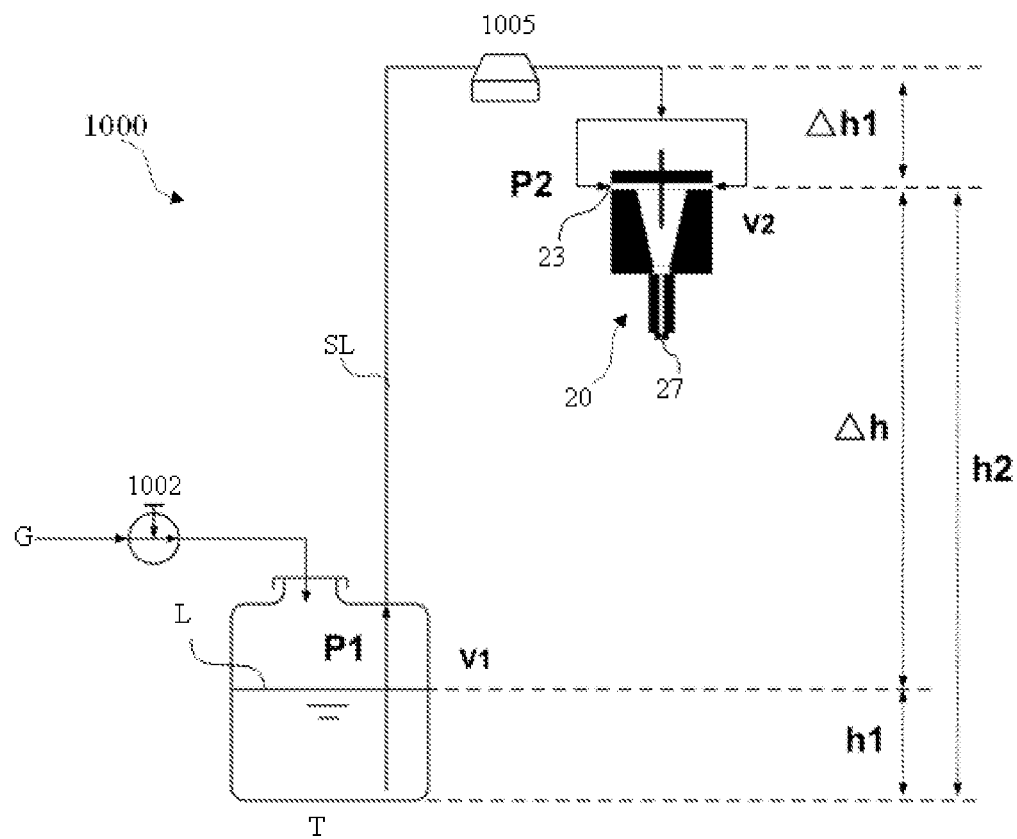
FIG. 6 is a schematic diagram of a sheath fluid pressure adjusting structure of a fluid unit according to an embodiment of the present disclosure.

FIG. 6 is a schematic diagram of sheath fluid pressure adjusting structure 1000 of a fluid unit according to an embodiment of the present disclosure. As shown in FIG. 6, sheath fluid container T is in communication with sheath fluid port 23 of flow cell unit 20 through sheath fluid line (that is, the above processing fluid line) SL. Flow cell unit 20 is located above sheath fluid container T. Taking a bottom wall of sheath fluid container T as a reference plane, a vertical height of sheath fluid level L in sheath fluid container T is h1, and a vertical height of sheath fluid port 23 of flow cell unit 20 is h2. A height difference between sheath fluid level L and sheath fluid port 23 is $\Delta$=h2−h1. Therefore, there is gravitational potential energy between sheath fluid level L and sheath fluid port 23. A fluid flow velocity of the sheath fluid at fluid level L is V1, and a fluid flow velocity at sheath fluid port 23 is V2. Therefore, there is kinetic energy between sheath fluid level L and sheath fluid port 23. Flow velocity V1 of the sheath fluid at fluid level L is close to zero, so it can be ignored. The pressure of the pressurized gas above fluid level L of sheath fluid container T is P1, and the pressure of the sheath fluid at sheath fluid port 23 is P2.

According to the Bernoulli's equation, the sum of pressure potential energy, kinetic energy, and potential energy should remain unchanged. However, as the running of sample processor 1 causes sheath fluid level L to drop or causes the position of the sheath fluid container to change in the vertical direction, sheath fluid pressure P2 will also change accordingly, which may affect processing of the sample. In order to keep sheath fluid pressure P2 at a constant value, sheath fluid pressure adjusting apparatus 1002 may be arranged on an upstream side of sheath fluid container T. Sheath fluid pressure adjusting apparatus 1002 is configured as described above to adjust pressure P1 of pressurized gas G that will enter sheath fluid container T.

In the embodiment of FIG. 6, sheath fluid pressure adjusting structure 1000 includes sheath fluid pressure sensor 1005 arranged in sheath fluid line SL. Sheath fluid pressure sensor 1005 is used for detecting the pressure of the sheath fluid supplied from sheath fluid container T to flow cell unit 20. Sheath fluid pressure adjusting apparatus 1002 is adjusted automatically or manually according to the pressure of the sheath fluid detected by sheath fluid pressure sensor 1005, thereby changing pressure P1. In order to accurately adjust pressure P1, a distance in the vertical direction between sheath fluid pressure sensor 1005 and flow cell unit 20 may not change. That is, $\Delta$h1 in FIG. 6 is constant. In an alternative example not shown, sheath fluid pressure sensor 1005 may be arranged in a position close to sheath fluid port 23.

According to the example of FIG. 6, since the value of $\Delta$h1 does not change, the sheath fluid pressure at sheath fluid pressure sensor 1005 can accurately reflect pressure P2 of the sheath fluid at sheath fluid port 23. When the pressure detected by sheath fluid pressure sensor 1005 changes, information representing the pressure change may be fed back to control unit 40 (as shown in FIG. 1A). Control unit 40 can control, according to the information, sheath fluid pressure adjusting apparatus 1002 to automatically adjust pressure P1. Adjusted pressure P1 makes the pressure (i.e., pressure P2) detected by sheath fluid pressure sensor 1005 reach a desired value again, thereby ensuring stable processing or detection of the sample.

Figure 7:
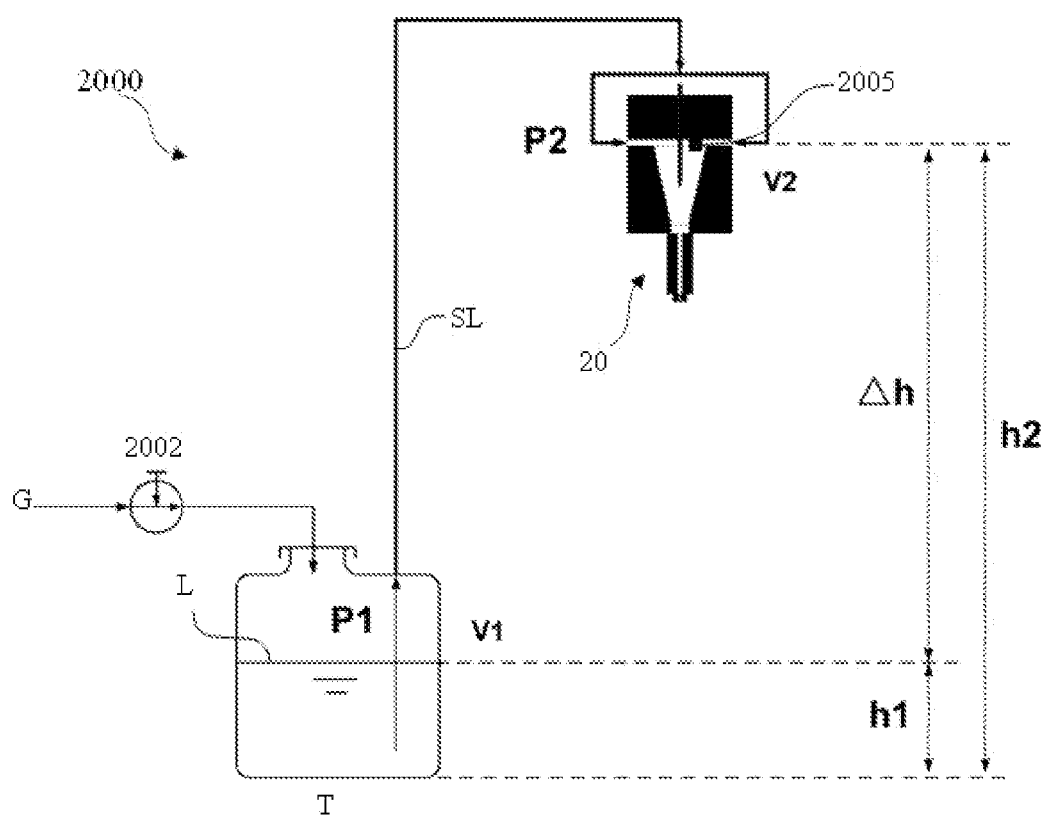
FIG. 7 is a schematic diagram of a sheath fluid pressure adjusting structure of a fluid unit according to another embodiment of the present disclosure.

FIG. 7 is a schematic diagram of sheath fluid pressure adjusting structure 2000 of a fluid unit according to another embodiment of the present disclosure. A difference between sheath fluid pressure adjusting structure 2000 and sheath fluid pressure adjusting structure 1000 lies in a position of arranging the sheath fluid pressure sensor. The similarities between sheath fluid pressure adjusting structure 2000 and sheath fluid pressure adjusting structure 1000 will not be described in detail.

As shown in FIG. 7, sheath fluid pressure adjusting structure 2000 includes sheath fluid pressure sensor 2005 arranged in flow cell unit 20. Therefore, the pressure of the sheath fluid at sheath fluid pressure sensor 2005 can accurately reflect pressure P2 of the sheath fluid at sheath fluid port 23. When the pressure detected by sheath fluid pressure sensor 2005 changes, information representing the pressure change may be fed back to control unit 40. Control unit 40 may control, according to the information, sheath fluid pressure adjusting apparatus 2002 to automatically adjust pressure P1, thereby ensuring stable processing or detection of the sample.

Figure 8:
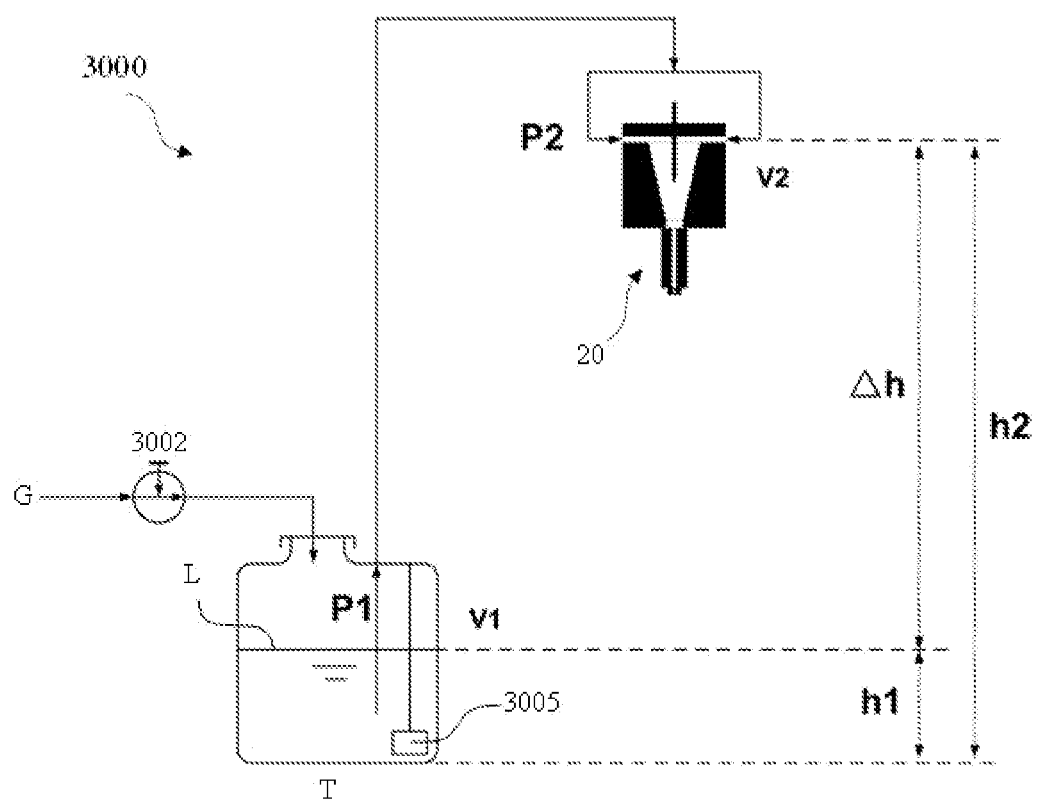
FIG. 8 is a schematic diagram of a sheath fluid pressure adjusting structure of a fluid unit according to still another embodiment of the present disclosure.

FIG. 8 is a schematic diagram of sheath fluid pressure adjusting structure 3000 of a fluid unit according to still another embodiment of the present disclosure. As shown in FIG. 8, sheath fluid pressure adjusting structure 3000 includes sheath fluid level sensor 3005. Sheath fluid level sensor 3005 is arranged in sheath fluid container T and used for detecting a fluid level of the sheath fluid therein, that is, h1. A change value of pressure P2 is estimated by the fluid level detected by sheath fluid level sensor 3005. When the estimated change value in pressure P2 affects the processing of the sample, sheath fluid pressure adjusting apparatus 3002 is controlled to automatically adjust pressure P1, thereby ensuring stable processing or detection of the sample.

Although the present disclosure has been described with reference to example embodiments, it should be understood that the present disclosure is not limited to the specific embodiments described and illustrated in the text. Without departing from the scope defined by the claims, those skilled in the art can make various changes to the example embodiments. Provided that there is no contradiction, features in the various embodiments can be combined with each other. Alternatively, a certain feature in the embodiment may also be omitted.

The invention claimed is:

1. A fluid system for a sample processor, the fluid system comprising:
    a flow cell unit comprising a sample port, a processing fluid port, and a vacuum port;
    a sample container;
    a sheath fluid container;
    a sample line configured to communicate a sample from the sample container to the sample port of the flow cell unit;
    a processing fluid line configured to communicate a sheath fluid from the sheath fluid container to the processing fluid port of the flow cell unit, wherein the processing fluid port of the flow cell unit is configured to connect to the processing fluid line and receive the sheath fluid from the sheath fluid container;
    a vacuum line in communication with the flow cell unit; and
    an air pump comprising a first output port and a second output port, wherein pressurized gas is generated by the air pump at the first output port, the first output port is in communication with the sample container and the sheath fluid container, a vacuum is generated by the air pump at the second output port, and the second output port is in communication with the vacuum port of the flow cell unit through the vacuum line, wherein the air pump includes a vacuum source and a pressure source.

2. The fluid system according to claim 1, wherein a vacuum chamber is arranged along the vacuum line, and the vacuum chamber is in communication with a waste fluid container through the air pump so that a waste fluid sucked from the vacuum chamber is discharged directly into the waste fluid container.

3. The fluid system according to claim 2, wherein the second output port of the air pump is in communication with a bottom of the vacuum chamber.

4. The fluid system according to claim 1, wherein a vacuum chamber is arranged along the vacuum line,
    a reversing valve is arranged between the vacuum chamber and the first output port and the second output port of the air pump to vacuumize or pressurize the vacuum chamber selectively, and
    the vacuum chamber is in communication with a waste fluid container through a fluid line.

5. The fluid system according to claim 4, wherein the fluid line is connected to a bottom of the vacuum chamber, and
    an outlet of the reversing valve is connected to an upper part of the vacuum chamber.

6. The fluid system according to claim 1, wherein a reversing valve is arranged along the processing fluid line, and the reversing valve is configured to communicate the sheath fluid from the sheath fluid container or a cleaning fluid from a cleaning fluid container with the flow cell unit selectively.

7. The fluid system according to claim 6, wherein the reversing valve is configured to:
    when the reversing valve is switched to the cleaning fluid container, suck the cleaning fluid in the cleaning fluid container to the flow cell unit by means of the vacuum generated at the second output port of the air pump; and
    after the cleaning fluid is sucked to the flow cell unit, switch the reversing valve to the sheath fluid container, and spray the fluid in the flow cell unit out through a spray port of the flow cell unit by means of generated at the first output port of the air pump.

8. The fluid system according to claim 1, further comprising:
    a waste fluid line discharging a waste fluid flowing out of a spray port of the flow cell unit into a waste fluid container; and
    a waste fluid pump arranged in the waste fluid line.

9. The fluid system according to claim 1, further comprising:
    a sheath fluid pressure adjusting apparatus arranged upstream of the sheath fluid container and configured to adjust a pressure of the pressurized gas supplied to the sheath fluid container; and
    a sample pressure adjusting apparatus arranged upstream of the sample container and configured to adjust a pressure of the pressurized gas supplied to the sample container.

10. The fluid system according to claim 9, further comprising:
    a sheath fluid pressure sensor configured to detect a pressure of the sheath fluid supplied from the sheath fluid container into the flow cell unit.

11. The fluid system according to claim 10, wherein the sheath fluid pressure adjusting apparatus is configured to automatically adjust, according to the pressure of the sheath fluid detected by the sheath fluid pressure sensor, the pressure of the pressurized gas supplied to the sheath fluid container.

12. The fluid system according to claim 10, wherein the sheath fluid pressure sensor is arranged in a sheath fluid line communicating the sheath fluid container with the flow cell unit.

13. The fluid system according to claim 12, wherein the sheath fluid pressure sensor is positioned in a position at a constant distance from the flow cell unit in a vertical direction.

14. The fluid system according to claim 10, wherein the sheath fluid pressure sensor is arranged in the flow cell unit.

15. The fluid system according to claim 9, further comprising:
    a sheath fluid level sensor arranged in the sheath fluid container and used for detecting a fluid level of the sheath fluid.

16. The fluid system according to claim 15, wherein the sheath fluid pressure adjusting apparatus is configured to automatically adjust, according to the fluid level detected by the sheath fluid level sensor, the pressure of the pressurized gas supplied to the sheath fluid container.

* * * * *